United States Patent
Chen et al.

(10) Patent No.: US 10,756,499 B2
(45) Date of Patent: Aug. 25, 2020

(54) SHELF ELECTRICAL SUPPLY SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Dong Chen, Zhejiang (CN); Jianguo Dong, Zhejiang (CN)

(73) Assignee: Self Electronics Co., Ltd., Ningbo (TW)

( * ) Notice: Subject to any disclaimer, the term of this patent is extended or adjusted under 35 U.S.C. 154(b) by 0 days.

(21) Appl. No.: 16/552,475

(22) Filed: Aug. 27, 2019

(65) Prior Publication Data

US 2020/0076144 A1    Mar. 5, 2020

(30) Foreign Application Priority Data

Aug. 28, 2018  (CN) .......................... 2018 1 0991597

(51) Int. Cl.
| | |
|---|---|
| *H01R 13/62* | (2006.01) |
| *H01R 31/06* | (2006.01) |
| *H01R 33/88* | (2006.01) |
| *H02G 3/30* | (2006.01) |
| *H01R 13/512* | (2006.01) |
| *H01R 25/14* | (2006.01) |

(52) U.S. Cl.
CPC ........... *H01R 31/06* (2013.01); *H01R 13/512* (2013.01); *H01R 13/6205* (2013.01); *H01R 33/88* (2013.01); *H02G 3/30* (2013.01); *H02G 3/305* (2013.01); *H01R 25/14* (2013.01); *H01R 25/142* (2013.01)

(58) Field of Classification Search
CPC ... H01R 13/6205; H01R 25/14; H01R 25/142
See application file for complete search history.

(56) References Cited

U.S. PATENT DOCUMENTS

| | | | | | |
|---|---|---|---|---|---|
| 2003/0223234 | A1* | 12/2003 | Tang | .................... | H01R 25/142 362/648 |
| 2007/0285949 | A1* | 12/2007 | Lodhie | .................... | F21V 21/35 362/648 |
| 2016/0061429 | A1* | 3/2016 | Waalkes | .................. | F21V 23/06 362/217.15 |
| 2016/0104985 | A1* | 4/2016 | Ewing | .................... | A47F 3/001 211/26 |

* cited by examiner

*Primary Examiner* — Tho D Ta
(74) *Attorney, Agent, or Firm* — Wang Law Firm, Inc.

(57) ABSTRACT

The invention relates to a shelf electrical supply system, comprising electrical supply guide track fixedly connected to a shelf; electrical input part connected to the electrical supply guide track; electrical component disposed on the electrical supply guide track; the electrical supply guide track comprises track groove, metal guide track disposed in the track groove, and the electrical input part is electrically connected to one end of the metal guide track; the electrical component comprises magnet block and conductive contact arranged around the magnet block, and when the electrical component is disposed on the electrical supply guide track, the magnet block is attracted to the metal guide track and the conductive contact is in contact with the metal guide track. The system has simple structure, convenient assembly and better personalized design.

9 Claims, 5 Drawing Sheets

SHELF ELECTRICAL SUPPLY SYSTEM

RELATED APPLICATION

This application claims priority to a Chinese Patent Application No. CN 201810991597.9, filed on Aug. 28, 2018.

FIELD OF THE TECHNOLOGY

The present invention relates to shelf equipment, with particular emphasis on a shelf electrical supply system.

BACKGROUND OF THE INVENTION

Shelves are widely used in shopping malls, supermarkets, logistics storage and other places. In order to be convenient to use, the shelf needs to be equipped with lighting fixtures, and the shelf needs to be space-saving and easy to assemble, which determines its higher requirements for structure and lighting.

In order to meet the above requirements, people have developed shelf electrical supply system, such as the shelf electrical supply disclosed in the Chinese utility model patent CN206318770U "shelf electrical supply head and shelf electrical supply system having same", the shelf electrical supply head comprises a bottom cover, a top cover set on the bottom cover, positive and negative wires sandwiched between the bottom cover and the top cover and insulated from each other, and positive and negative electrical contacts sandwiched between the bottom cover and the top cover. The positive and negative electrical contacts respectively comprise a positive and negative sleeve, and two superposed positive and negative magnets respectively accommodated in the positive and negative sleeves, wherein the positive and negative sleeves respectively accommodate two magnets repelling each other and are located between the positive and negative extensions and the top cover, the positive and negative extensions respectively protrude from the positive and negative contact extension holes by the repulsive force of the two magnets respectively accommodated in the positive and negative sleeves; when the bracket arm of the shelf electrical supply system is inserted into the slotted hole of the column, the assembly is completed and then it provides support for lighting.

However, the shelf electrical supply system has a complicated structure, is inconvenient to install, and is also complicated to assemble with the shelf. If the entire shelf has been assembled, to assemble the shelf electrical supply system device, it is necessary to find the corresponding slot hole on the shelf for assembly. If the shelf placement position is not suitable for the exposure of the slotted hole, it will result in difficulty in power taking, and most of the electrical supply heads need to adopt materials that are consistent with the shelf material to facilitate installation. If the materials are different, it may lead to the failure of fixed assembly between the electrical supply head and the shelf, resulting in no space for the user to choose combination assembly.

BRIEF SUMMARY OF THE INVENTION

In order to solve the above problems, the present invention provides a shelf electrical supply system that is simple in assembly structure, flexible in assembly mode, and convenient for the user to select an assembly combination according to actual conditions.

To achieve the above purposes, the technical scheme of the invention is as follows: a shelf electrical supply system, comprising:

electrical supply guide track fixedly connected to a shelf;
electrical input part connected to the electrical supply guide track;
electrical component disposed on the electrical supply guide track;
the electrical supply guide track comprises track groove, metal guide track disposed in the track groove, and the electrical input part is electrically connected to one end of the metal guide track;
the electrical component comprises magnet block and conductive contact arranged around the magnet block, and when the electrical component is disposed on the electrical supply guide track, the magnet block is attracted to the metal guide track and the conductive contact is in contact with the metal guide track.

advantageously, the track groove of the electrical supply guide track is made of non-conductive material, and the lower side of the track groove is fixedly connected to the shelf by soft magnet, and the soft magnet is bonded to the lower side of the track groove.

advantageously, the track groove of the electrical supply guide track is made of non-conductive material, and the lower side of the track groove is fixedly connected to the shelf by double-sided tape.

advantageously, the electrical component further comprises conductive plate and electrical plug, and the conductive plate is provided with a through hole for the magnet block to pass through, the conductive contact is disposed on the conductive plate and protrudes from the conductive plate, and the electrical plug is electrically connected to the conductive plate through wire.

advantageously, the electrical component further comprises a cover plate between the metal guide track and the conductive plate and a bottom case disposed on the cover plate, the cover plate is provided with a first hole and a second hole where for the magnet block and the conductive contact are extending from respectively;

the inner wall of the bottom case is formed with a hollow column along a direction perpendicular to the electrical supply guide track, and the two opposing sidewalls of the bottom case which is parallel to the extending direction of the electrical supply guide track extend downwardly to form a clamping part;

in the assembly state, the hollow column passes through the through hole and the first hole successively and is sleeved around the periphery of the magnet block, and the clamping part is connected with the two outer sidewalls of the track groove which is in the extension direction by clamping.

advantageously, a cylinder formed by extending in the same direction as the hollow column is formed in the hollow column, and the magnet block is provided with a mounting hole, and the cylinder is extended into the mounting hole in the assembly state.

advantageously, the conductive contacts have four, divided into two groups and arranged on both sides of the magnet block, and the conductive contacts on the same side are of the same grade.

advantageously, the electrical input part comprises a bottom plate, a housing which is arranged above the bottom plate and is enclosed with the bottom plate to form a holding cavity, and a guide line extending into the holding cavity from one side of the housing and connected to the metal guide track, and a plug that is connected to the other end of the guide line.

advantageously, the housing is internally provided with a blind hole, and the bottom plate is located below the track groove and connected with the blind hole by screw which passes through the track groove and the metal guide track successively.

advantageously, the metal guide track is connected to the track groove by double-sided tape.

Compared with the prior art, the invention has the advantages that the metal guide track is used as the power transmission medium, the installation between the metal guide track and the track groove is facilitated, the area of the conductive transmission medium is increased, and any point of contact between the conductive contact and the metal guide rail can obtain electricity, and it overcomes the problem that the conductive transmission medium area is too small or the conductive transmission medium needs to match the position of the conductive contact properly to obtain electricity, otherwise the electricity is not stable, and the overall structure of the system is simplified; the magnet block connects the electrical component to the metal guide track by means of suction, which can increase the force of the electrical component toward the metal track, so that the contact between the conductive contact and the metal guide track is more stable, and the electrical effect is ensured; the track groove is made of insulating material which allows the operator to select the connection between the system and the shelf according to the actual material of the shelf, providing a choice space for the customer to use, and the personalized design is better.

DETAILED DESCRIPTION OF THE INVENTION

Embodiments of the invention are described in detail below, Examples of the embodiments are shown in the appended drawings in which consistently identical or similar labels represent identical or similar elements or elements having the same or similar function. The embodiments described below by reference to the drawings are exemplary and are only used for the interpretation of the invention and cannot be understood to be a limitation of the invention.

As shown in FIG. 1-5, it is a preferred embodiment of the shelf electrical supply system of the present application, it should be noted that only one embodiment of the present invention is shown here, which does not mean that the present application is limited to this case. Other lamps and methods that can achieve the functions and effects described in the present application are all within the scope of the present application.

Figure 1:
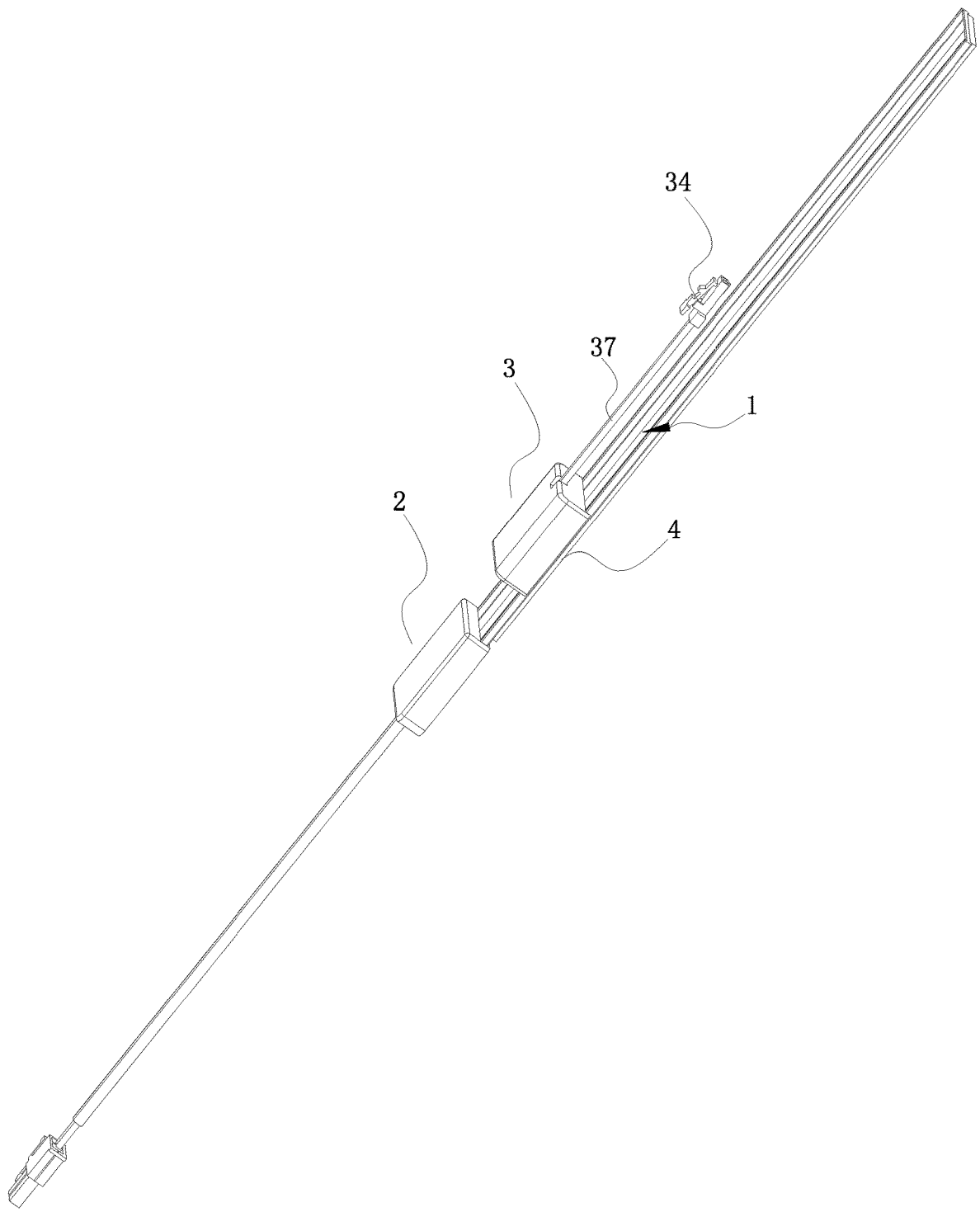
FIG. 1 is a structural view of a preferred embodiment of a shelf electrical supply system of the present invention.
Figure 2:
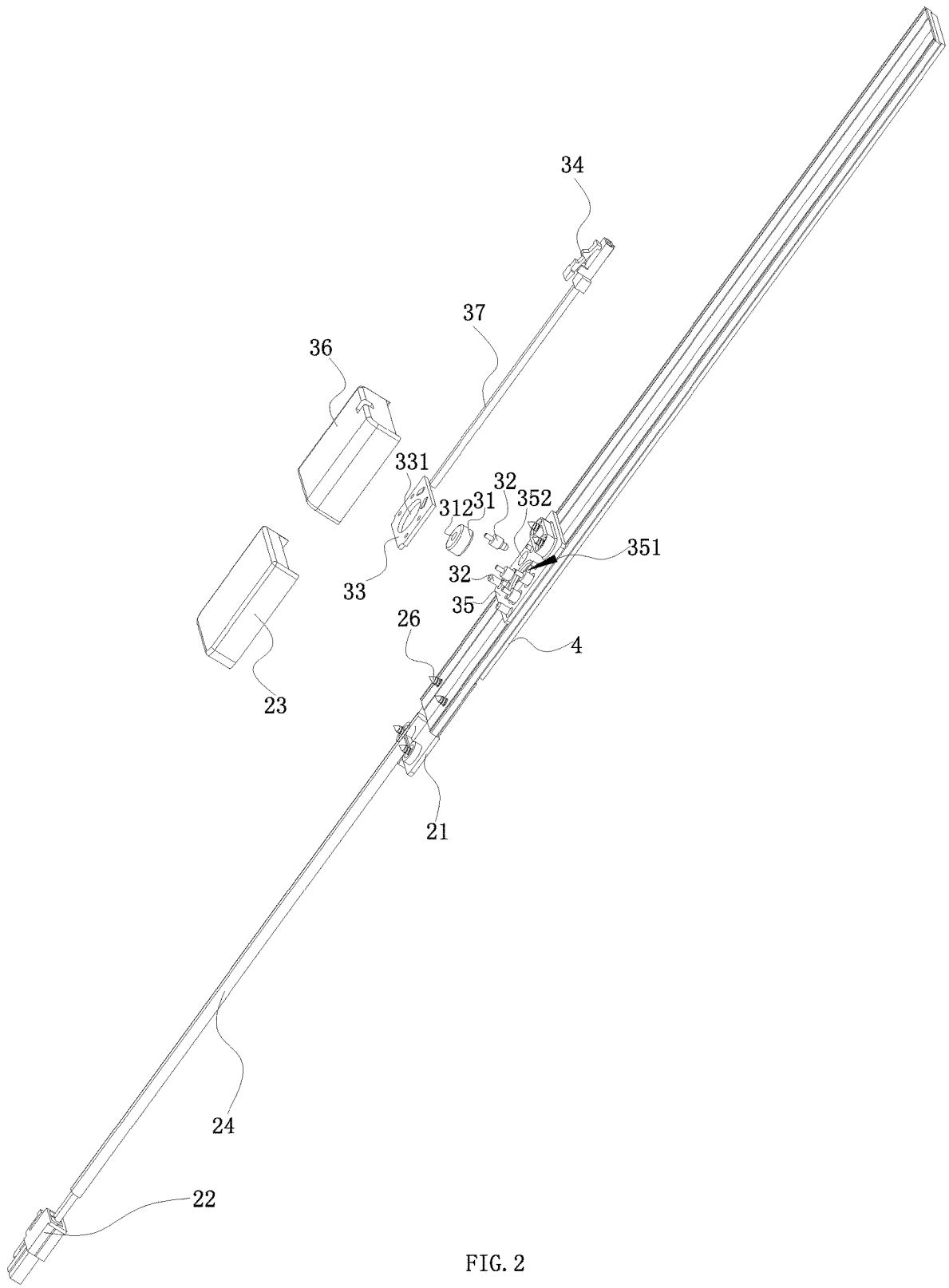
FIG. 2 is an exploded structural view of FIG. 1.
Figure 3:
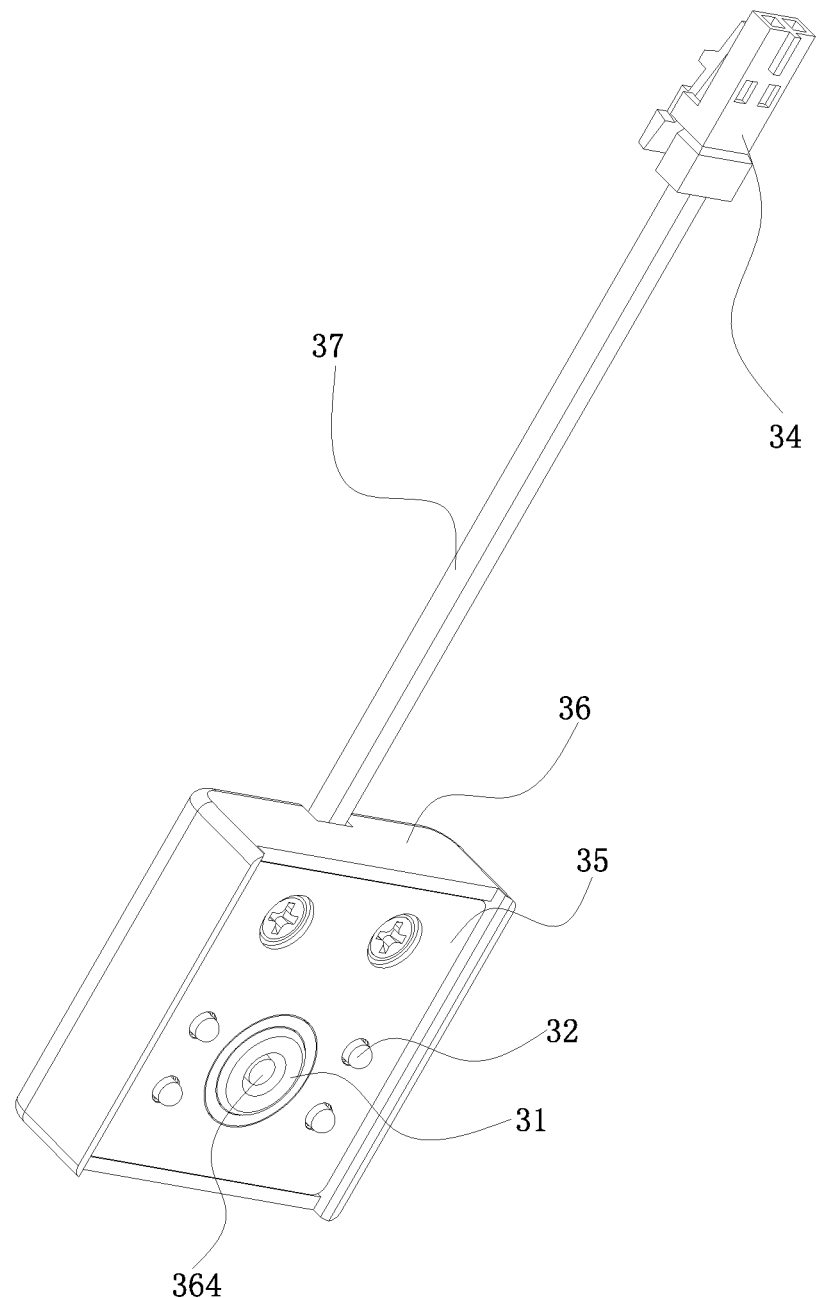
FIG. 3 is a structural view of the electrical component of FIG. 1.
Figure 4:
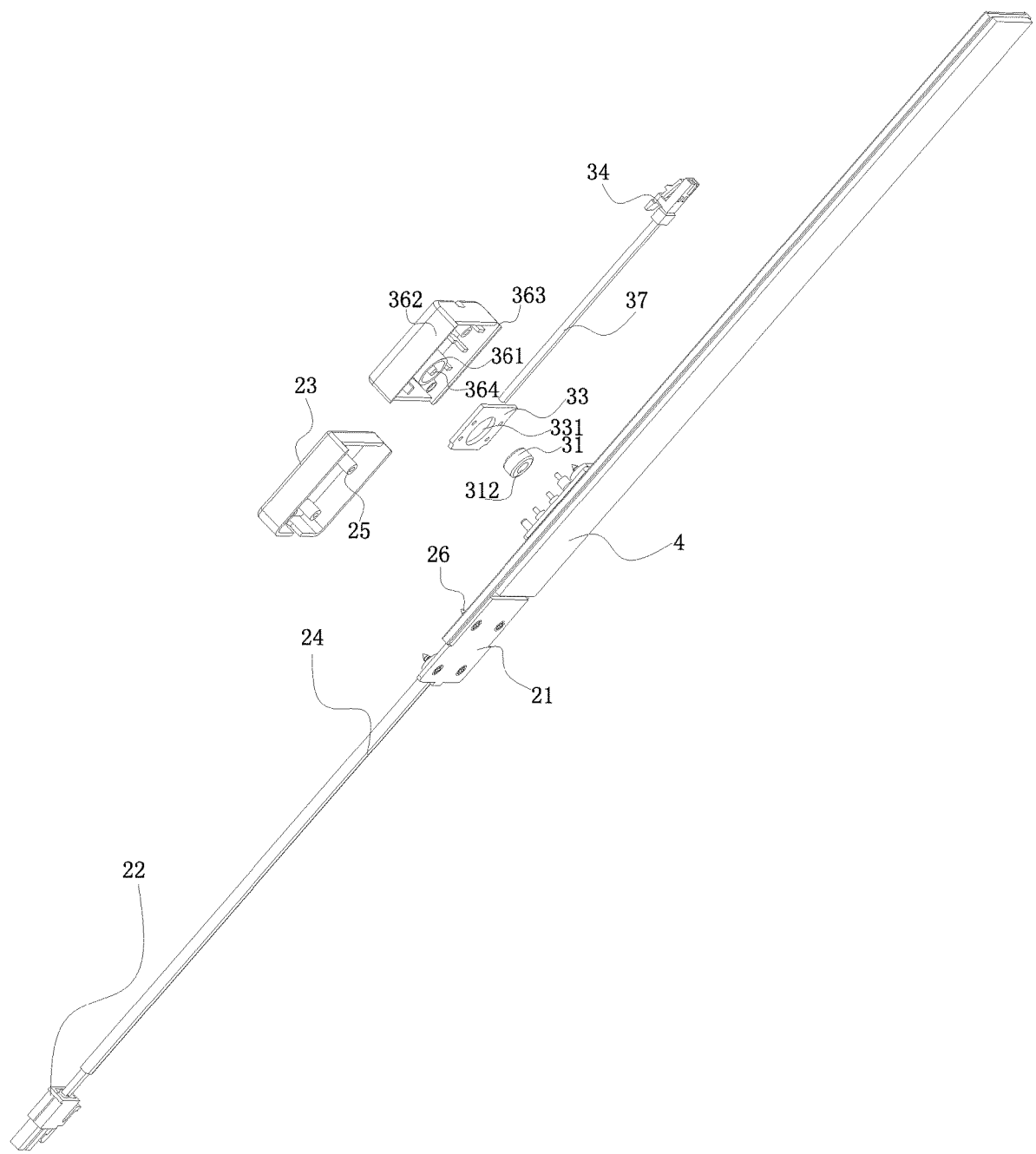
FIG. 4 is a schematic view of another angle of FIG. 2.
Figure 5:
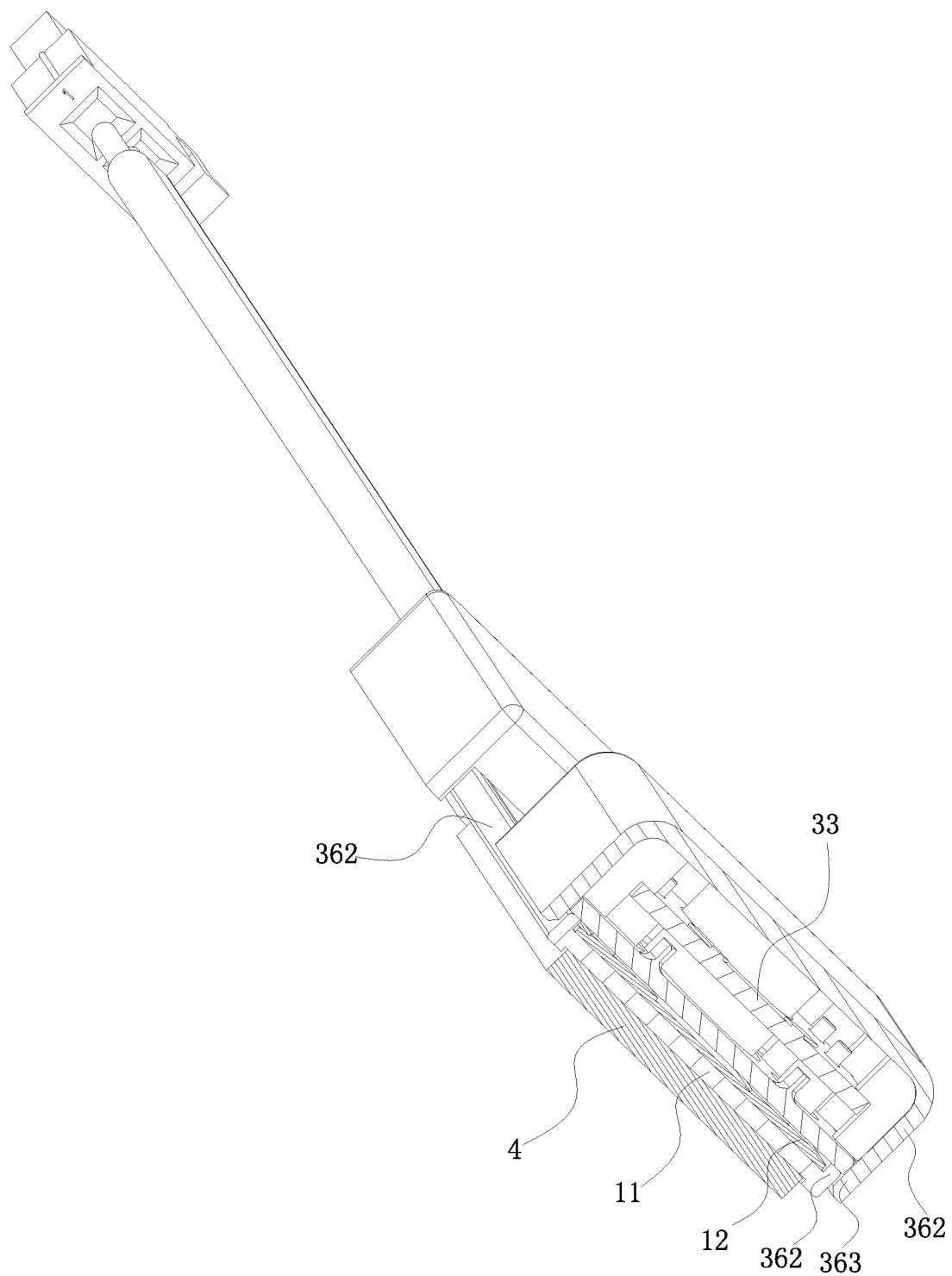
FIG. 5 is a cross-sectional view of FIG. 1.

As shown in FIG. 2 and FIG. 4-5, the shelf electrical supply system comprises a electrical supply guide track 1 which is fixedly connected to a shelf (not shown in the figures), a electrical input part 2 connected to the electrical supply guide track 1, and a electrical component 3 disposed on the electrical supply guide track 1. It is conceivable that the shelf electrical supply system also comprises other components such as power supply, but these components are not the focus of this application for protection and will not be repeated here.

The electrical supply guide track 1 comprises track groove 11 and metal guide track 12 disposed in the track groove 11. The electrical input part 2 is electrically connected to one end of the metal guide track 12. The electrical component 3 comprises magnet block 31 and conductive contact 32 arranged around the magnet block 31. When the electrical component 3 is disposed on the electrical supply guide track 1, the magnet block 31 is attracted to the metal guide track 12 and the conductive contact 32 is in contact with the metal guide track 12 to take power.

The metal guide track is used as the power transmission medium to install with the track groove, which not only increases the installation area between it and the track groove, but also facilitates their assembly operation and simplifies the production process; Meanwhile, compared with the previous conductive sheet or conducting strip, the use of metal guide track increases the conductive transmission medium area, is convenient for contact between conductive contact and any point of metal guide track to obtain electricity, and overcomes the problem that the conductive transmission medium area is too small or the conductive transmission medium needs to match the position of the conductive contact properly to obtain electricity, otherwise the electricity is not stable.

Moreover, the magnet block is attracted to the metal guide track, which can increase the force of the electrical component toward the metal guide track, thus generating a trend force for the contact between the electrical component and the metal guide track, making the contact between the conductive contact and the metal guide track more stable and ensuring the electrical effect.

In this embodiment, the track groove 11 is made of non-conductive material. The upper side of the track groove is grooved, and the lower side is also grooved. The metal guide track 12 is located in a groove on the upper side. The track groove 11 can be fixedly connected to the shelf by various connection methods. For example, the lower side of the track groove 11 is fixedly connected to the shelf by the soft magnet 4, and the soft magnet 4 is bonded to the lower side of the track groove 11, it is conceivable that the shelf is made of metal material; the lower side of the track groove 11 can also be directly connected to the shelf through the double-sided tape, and the shelf can be made of metal material or other materials such as plastic parts. The specific method of fixing the electrical supply guide track and shelf is determined by the material used in the shelf. The advantage of this is that after the shelf is assembled, the shelf electrical supply system can be also take proper installation on the shelf, the realization of this point can be achieved by connecting the electrical supply system to the shelf by magnetic absorption or bonding according to the material of the shelf, which provides users with a variety of options and meets the practical application requirements. Personalized design is better.

The metal guide track 12 in this embodiment is iron-base copper track, which is fixed to the track groove 11 by double-sided tape or screw fixation or insertion. As these connection modes are relatively conventional technical means, they are not described here and only the screw fixing method will be briefly described below.

The electrical component 3 further comprises a conductive plate 33 and an electrical plug 34. The conductive plate 33 is provided with a through hole 331 for the magnet block 31 to pass through. The conductive contact 32 is welded to the conductive plate 33 and extended out from the conductive plate 33. The electrical plug 34 is welded to the conductive plate 33 through wire 37. Specifically, the magnet block 31 is a cylinder, which facilitates the passage through the through hole 331.

In order to achieve a fixing connection between the electrical component and the electrical supply guide track, the electrical component 3 further comprises a cover plate 35 between the metal guide track 12 and the conductive plate 33 and a bottom case 36 on the cover plate 35. The cover plate 35 is provided with a first hole 351 and a second hole 352 where for the magnet block 31 and the conductive contact 32 are extending from respectively. The inner wall of the bottom case 36 is formed with a hollow column 361 along the direction of the vertical electrical supply guide track 1, and the two opposing sidewalls 362 of the bottom case 36 which is parallel to the extending direction of the electrical supply guide track 1 extend downwardly to form a clamping part 363. In the assembly state, the hollow column 361 passes through the through hole 331 and the first hole 351 successively and is sleeved around the periphery of the magnet block 31. The clamping part 363 is connected with the two outer sidewalls of the track groove 11 which is in the extension direction by clamping. So that the magnet block 31 can be effectively prevented from being shaken or displaced due to moving shelves or vibration, and the wire is generally fixed in length. In this case, it is possible to avoid the problem that the electrical plug 34 is in contact with the lamp under the action of the magnet block 31 and cannot be electrically conducted.

Obviously, the inner diameter of the first hole 351 in this case is larger than the outer diameter of the hollow column 361, and the inner diameter of the hollow column 361 is larger than the outer diameter of the magnet block 31, but in order to facilitate assembly and ensure stability of assembly, the difference between two diameters needs to be controlled, so that the hollow column 361 is assembled in the first hole 351 and the magnet block 31 is set in the hollow column in 361.

In order to further control the displacement of the magnet block and improve the assembly firmness between the components of the electrical component, as a preferred embodiment of the present application, the cylinder 364 formed by extending in the same direction as the hollow column 361 is formed in the hollow column 361, and the corresponding magnet block 31 is provided with a mounting hole 312, and the cylinder 364 is extended into the mounting hole 312 in the assembly state. It is easily conceivable that the hollow column 361, magnet block 31 and cylinder 364 after the assembly are distributed in concentric circles on the transverse section parallel to the electrical supply guide track 1. After the cylinder 364 is inserted into the mounting hole 312, it can cooperate with the hollow column 361 to further limiting the shaking displacement of the magnet block 31 located between the two. Please also refer to FIG. 3. There are four conductive contacts 32, which are divided into two groups and arranged on both sides of magnet block 31, and the conductive contacts on the same side are of the same grade. Of course, the conductive contacts can also be in other quantities, which can be determined according to actual needs.

Referring to FIG. 2, the electrical input part 2 comprises a bottom plate 21, a housing 23 which is arranged above the bottom plate 21 and is enclosed with the bottom plate 21 to form a holding cavity, and a guide line 24 extending into the holding cavity from one side of the housing 23 and connected to the metal guide track 12, and a plug 22 at the other end of the guide line. Referring to FIG. 5, as shown, the housing 23 is internally provided with a blind hole 25, and the bottom plate 21 is located below the track groove 11 and connected with the blind hole 25 by screw 26 which passes through the track groove 11 and the metal guide track 12 successively, so as to realize the electrical connection between the electrical input part 2 and the electrical supply guide track 1, meanwhile, in this connection mode, the metal guide track 12 is fixed with the track groove 11 by the aforementioned screw connection mode.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A shelf electrical supply system, comprising:
    electrical supply guide track (1) fixedly connected to a shelf;
    electrical input part (2) connected to the electrical supply guide track (1);
    electrical component (3) disposed on the electrical supply guide track (1); the electrical supply guide track (1) comprises track groove (11), metal guide track (12) disposed in the track groove (11), and the electrical input part (2) is electrically connected to one end of the metal guide track (12);
    the electrical component (3) comprises magnet block (31) and conductive contact (32) arranged adjacent to the magnet block (31), and when the electrical component (3) is disposed on the electrical supply guide track (1), the magnet block (31) is attracted to the metal guide track (12) and the conductive contact (32) is in contact with the metal guide track (12); wherein the electrical component (3) further comprises conductive plate (33) and electrical plug (34), and the conductive plate (33) is provided with a through hole (331) for the magnet block (31) to pass through, the conductive contact (32) is disposed on the conductive plate (33) and protrudes from the conductive plate (33), and the electrical plug (34) is electrically connected to the conductive plate (33) through wire (37).

2. The shelf electrical supply system as claimed in claim 1, wherein the track groove (11) of the electrical supply guide track (1) is made of non-conductive material, and the lower side of the track groove (11) is fixedly connected to the shelf by soft magnet (4), and the soft magnet (4) is bonded to the lower side of the track groove (11).

3. The shelf electrical supply system as claimed in claim 1, wherein the track groove (11) of the electrical supply guide track (1) is made of non-conductive material, and the lower side of the track groove (11) is fixedly connected to the shelf by double-sided tape.

4. The shelf electrical supply system as claimed in claim 1, wherein there are four conductive contacts (32), divided into two groups and arranged on both sides of the magnet block (31), and the conductive contact (32) on the same side is of the same grade.

5. The shelf electrical supply system as claimed in claim 1, wherein the metal guide track (12) is connected to the track groove (11) by double-sided tape.

6. The shelf electrical supply system as claimed in claim 1, wherein the electrical component (3) further comprises a cover plate (35) between the metal guide track (12) and a conductive plate (33) and a bottom case (36) disposed on the cover plate (35), the cover plate (35) is provided with a first hole (351) and a second hole (352) where for the magnet block (31) and the conductive contact (32) are extending from respectively;

the inner wall of the bottom case (36) is formed with a hollow column (361) along a direction perpendicular to the electrical supply guide track (1), and the two opposing sidewalls (362) of the bottom case (36) which is parallel to the extending direction of the electrical supply guide track (1) extend downwardly to form a clamping part (363);

in the assembly state, the hollow column (361) passes through the through hole (331) and the first hole (351) successively and is sleeved around the periphery of the magnet block (31), and the clamping part (363) is connected with the two outer sidewalls (13) of the track groove (11) which is in the extension direction by clamping.

7. The shelf electrical supply system as claimed in claim 6, wherein a cylinder (364) formed by extending in the same direction as the hollow column (361) is formed in the hollow column (361), and the magnet block (31) is provided with a mounting hole (312), and the cylinder (364) is extended into the mounting hole (312) in the assembly state.

8. The shelf electrical supply system as claimed in claim 1, wherein the electrical input part (2) comprises a bottom plate (21), a housing (23) which is arranged above the bottom plate (21) and is enclosed with the bottom plate (21) to form a holding cavity, and a guide line (24) extending into the holding cavity from one side of the housing (23) and connected to the metal guide track (12), and a plug (22) that is connected to the other end of the guide line (24).

9. The shelf electrical supply system as claimed in claim 8, wherein the housing (23) is internally provided with a blind hole (25), and the bottom plate (21) is located below the track groove (11) and connected with the blind hole (25) by screw (26) which passes through the track groove (11) and the metal guide track (12) successively.

\* \* \* \* \*